Patented Nov. 18, 1947

2,431,078

UNITED STATES PATENT OFFICE 2,431,078

VINYL RESIN SUSPENSIONS

George M. Powell, 3rd, and Theodore E. Mullen, South Charleston, W. Va., assignors to Carbide and Carbon Chemicals Corporation, a corporation of New York No Drawing. Application June 27, 1944, Serial No. 542,432

2 Claims. (Cl. 260—32)

This invention relates to a method for making non-aqueous dispersions of polymers containing combined vinyl chloride, which polymers are of limited solubility in the usual organic solvents, and to the stable dispersions made by such process.

Many artificial resins containing vinyl chloride polymerized therein have valuable film-forming properties by reason of their tensile strength, their chemical inertness, and their high softening point, but are difficult to disperse as coating or film-forming compositions by reason of the limited solubility of such resins in the available organic solvents. Some types of vinyl resins containing combined vinyl chloride, including medium molecular weight copolymers of vinyl chloride with vinyl acetate and certain copolymers of vinyl chloride with vinylidine chloride, which are specifically manufactured for use in coatings, suffer from the disadvantage that they must be applied from solutions having a resin content of about 8 to 20%, relatively large amounts of expensive ketone solvents being ordinarily required for this purpose. When articles are coated with dilute solutions, multiple coats must be applied to secure the requisite coating thickness, and large volumes of solvents are necessarily handled. Other types of vinyl chloride resins have only limited use in coating compositions because some of such resins are virtually insoluble, or difficultly soluble, in the common organic solvents at ordinary temperatures, and adequate amounts of others cannot be dissolved at ordinary temperatures in such solvents without the solutions becoming unduly viscous or gelling.

Virtually insoluble or difficultly soluble resins include delta and gamma polyvinyl chloride, while more soluble resins having but limited use in coating compositions, at present, include beta polyvinyl chloride, copolymers of vinyl chloride and vinyl acetate, which have average molecular weights above 16,000 as determined by Staudinger's method, and vinyl chloride contents within the range of 90 to 97%, as well as copolymers of vinyl chloride with dibutyl maleate, ethyl acrylate, methyl acrylate, butyl acrylate, methyl methacrylate, and butyl methacrylate of substantially the same combined vinyl chloride content and average molecular weight. The recently developed copolymers of vinyl chloride with acrylonitrile, containing from 45 to 80% vinyl chloride, are soluble in acetone but insoluble in many other solvents, which restricts their field of use in solution coatings. Types of vinyl chloride-organic ester copolymers which are manufactured specifically for coatings have molecular weights above 10,000 and below 16,000. It is understood that the molecular weights are relative, not absolute values, computed from the specific viscosity of the resins according to Staudinger's method. Certain copolymers of vinyl chloride with vinylidine chloride are also recommended for coatings, but the permissible concentration of such resins in methyl ethyl ketone is not more than about 14% at 25° C. All of the foregoing resins may be characterized as those substantially insoluble in toluene at 25° C., that is, toluene in the ratio of ten parts of toluene to one of resin will extract a fraction amounting to no more than 15% of the entire resin. Hereinafter the term "vinyl chloride resins" will be used to designate these vinyl chloride-containing polymers.

While some degree of success has been attained in coating articles with hot solutions of these vinyl chloride resins, problems of gelation are encountered if the hot solution cools too rapidly before the solvent is evaporated, or if the reservoir for the coating solution is not heated uniformly. The hazards of fire and possible toxicity of solvent fumes are naturally increased, and problems of the thermal stability of the vinyl chloride resins in the hot solutions arise when the solutions are kept hot for prolonged periods.

It is the object of this invention to prepare non-aqueous suspension-type coatings, as contrasted to solution coatings, of the less soluble vinyl chloride-containing polymers. These suspensions may contain liquids which are true solvents for the resin, but in insufficient quantity to cause the formation of a true solution. Another object is to prepare non-aqueous suspensions from which strong, continuous films may be formed by fusing the discrete particles deposited from the suspensions on film-supporting surfaces, as by a baking operation. Other objects are to overcome present disadvantages of solution coatings by preparing vinyl resin coating compositions of high solids content, and by preparing coatings which release their volatile constituents rapidly and which have a minimum tendency to blister during baking.

Aqueous dispersions of vinyl chloride resins are known which result from emulsifying vinyl chloride with or without another polymerizable material, in water and subjecting the emulsion to conditions which favor polymerization. It has been proposed to add plasticizers to such dispersions, either before or after polymerization, and to use the dispersions for coating purposes. Such dispersions have certain advantages, but they are also subject to definite limitations. The aqueous suspensions or hydrosols lack stability and the water causes shrinkage of paper and cloth, and rusting of iron and steel, when the hydrosols are employed in contact with such materials. In addition, it is somewhat difficult to blend modifying agents such as waxes, plasticizers and other resins in such hydrosols. Furthermore, it is frequently necessary to regulate drying rates to suit standard equipment, and this can be done only to a limited extent with aqueous suspensions. Finally, these hydrosols often contain as essential ingredients in the polymerization, water-dispersible protective colloids and polymerization catalysts, such as peroxides, which reduce the resistance of the finished coatings to water, light and chemical reagents.

According to this invention, non-aqueous suspensions of minutely sub-divided vinyl chloride resins having an average particle size usually less than five microns are produced by first polymerizing an aqueous emulsion of vinyl chloride, desirably in the presence of another polymerizable substance, coagulating the resulting hydrosols and drying the resin aggregates obtained in such a manner as to render the aggregates disintegrable. The resin particles are then dispersed in dispersion media which are non-solvents for the resin, but which, in conjunction with a plasticizer for the resin normally included in coating compositions, have a slight swelling or solvating action for the resin. When little plasticizer or none at all is employed, a small amount of a ketone, an ester, or other true solvent for the resin, may be included to increase the swelling or solvating action of the dispersion media. As dispersion media, we prefer mixtures containing substantial amounts of both aromatic and aliphatic hydrocarbons. In conjunction with plasticizers, solvents or both, such mixtures have the proper swelling or solvating action for the resins to insure the production of stable dispersions.

The resulting dispersions are not solutions, but suspensions, and they differ from solutions in many particulars. In the first place, the suspensions are not limited to low total solids contents, as are solutions, but, on the contrary, they may contain up to about 50% resin by weight and still remain fluid. In addition, the suspensions often exhibit pseudo-plastic flow and other anomalous flow characteristics, whereas solutions tend to exhibit more truly viscous flow. (See Chemical Engineer's Handbook, McGraw-Hill, 1934 edition, page 1271.) In addition, the forces of molecular attraction between the resin and the dispersion media are much lower, so that films deposited from suspensions release their volatile constituents rapidly, whereas films laid down from solutions tend to retain tenaciously their contained solvents. Consequently baking schedules for films applied from solutions must be carefully adjusted to avoid blistering.

It is apparent from the foregoing discussion that the development of these suspensions of vinyl chloride resins represents an important contribution to the art in that the cost of depositing such resins from suspensions (not considering the cost of the resin itself) may be as low as $1/5$ to $1/10$ the cost of a solution-applied coating. This reduction in costs is made possible by the higher total solids of the suspension at application consistencies, and by the fact that the suspending liquids, being predominantly hydrocarbons, are less costly than solvents. The ratio of resin to hydrocarbons in the suspensions is usually greater than 0.3:1 and may be as high as 1.9:1 whereas in solution coatings, the ratio of vinyl chloride resin to solvents or solvent-hydrocarbon mixtures, varies from 0.04:1 to 0.2:1, depending on the type of resin. In our preferred suspensions, the ratio of resin to hydrocarbon varies from 0.5:1 to 1.2:1.

The successful production of these suspensions is dependent on a number of factors. Of primary importance is the production of minutely subdivided resin particles by emulsion polymerization. Resin produced by other methods cannot be suspended nearly so satisfactorily, even after intense pulverizing.

In forming the resin, the monomeric materials are placed under pressure to liquefy the vinyl chloride, and emulsified in from one to three times their weight of water, preferably by the aid of an emulsifying agent, such as sodium lauryl sulfate, sodium tetradecyl sulfate, sodium heptadecyl sulfate, morpholine tetradecyl sulfate, morpholine oleate, sodium alkyl napthalene sulfonate or sodium dioctyl sulfo-succinate. The emulsion is then heated at temperatures up to about 40° to 50° C. in the presence of polymerization catalysts, such as persulfuric acid and persulfates, sodium perborate, lithium perborate or hydrogen peroxide. The polymerization may be conducted either batch-wise or continuously. The resin produced by this process is extremely finely divided. In one instance, an ultimate particle size of the order of 0.02 to 0.13 micron was determined by the electron microscope.

At the end of the polymerization, the unreacted vinyl chloride and other polymerizable substance, if present, are removed, and the resin is caused to coagulate or agglomerate, and to fall from suspension. Normally a dilute aqueous solution of a salt, such as calcium chloride, sodium chloride, aluminum chloride, magnesium chloride or aluminum sulfate, or of an acid, such as hydrochloric, sulfuric or phosphoric acid and the like is employed for the purpose in an amount of one to two times that of the suspension. In order to maintain the precipitated particles of resin in a relatively loosely agglomerated condition, it is desirable to slowly add the coagulating solution to the suspension with vigorous agitation, frequently accompanied by heating. After coagulation, the resin particles are washed to remove the polymerization catalyst, emulsifying agent and the coagulating salts, separated from the water by centrifuging or filtration, and dried.

The hydrosols or colloidal aqueous suspensions of the resins produced by emulsion polymerization may also be coagulated by slow-freezing, and then thawing. The resin settles out readily in almost crystal-like clear particles of 10 to 40 mesh size. These particles appear more or less transparent under the microscope and show a conchoidal fracture, typical of finely divided amorphous materials.

In either case, it has been found that the coagulated resins are in a form which can be dispersed very readily in the liquids heretofore described after suitable preparation. If desired, the dry agglomerated particles may be sub-divided by mechanical grinding, as in a ball mill, before being dispersed in non-solvent liquids, but this is not essential for good results. As dispersion media, we desirably employ a blend of aliphatic and aromatic hydrocarbons containing from 20 to 80% by weight of aromatic hydrocarbons. It has been found that such blends have a very slight solvating action for the resin, which permits stable suspensions to be produced. If the resin particles are not solvated at all, they cannot be stably suspended. If they are swollen excessively, the suspended particles interlock to form rigid gels. Any of the aliphatic hydrocarbons customarily employed in the coatings industry may be included in the blend, such as mineral spirits, having a boiling range from 305.5° to 405° F., or mixtures of the more volatile paraffin hydrocarbons boiling from 200° to 300° F., which may contain heptane, octane, and nonane. By the term "aliphatic hydrocarbons" we also include cycloaliphatic hydrocarbons or alicyclic hydrocarbons, such as cyclohexane, methyl cyclohexane, dimethyl cyclopentane, cyclohexene, and methyl cyclohexene. Suitable aromatic hydrocarbons include benzene, toluene, xylene, and the commercial hydrogenated petroleum naphthas. Preferably, we employ from 1 to 2.3 parts of the aromatic hydrocarbons for each part of the aliphatic hydrocarbons in the blend.

The inclusion of a plasticizer or a small amount of a more volatile active solvent in the suspending media is important in obtaining suspensions of high solids content, good flow characteristics, satisfactory stability, and easy fusibility on baking. The proportion of plasticizer employed may be that normally used to obtain flexible films, or soft coatings for cloth. To some extent, the ratio of aromatic to aliphatic hydrocarbons in the suspending liquids can be adjusted to compensate for differences in amounts of plasticizer and for differences in the solvent action of the plasticizer on the resin. Plasticizers are thus considered as high-boiling solvents for the resin and those plasticizers, as well as mixtures thereof, that have been used successfully include the following:

Di(2-ethylhexyl) phthalate
Two parts di(2-ethylhexyl) phthalate and one part butyl ester of acetylated polymerized ricinoleic acid
Tricresyl phosphate
Methoxyethyl acetyl ricinoleate
Di(butoxyethyl) phthalate
Butyl phthalyl butyl glycolate
Equal parts di(2-ethylhexyl) phthalate and xylyl heptadecyl ketone
Tri(2-ethylhexyl) phosphate When about 35 to 40 parts of plasticizer to 100 parts of dry resin are employed, blends of aliphatic and aromatic hydrocarbons provide a very satisfactory suspension medium. However, if much less than this proportion of plasticizer is used, it is advisable to incorporate in the thinner a small amount of an active, more volatile solvent for the vinyl chloride resin, such as n-butyl acetate, acetone, methyl ethyl ketone, methyl n-amyl ketone, methyl isobutyl ketone, isophorone, or the like. The proportion of active solvent need not be large, and it varies to some extent with the solvent power of the solvent used. It is usually unnecessary to add over about 60 parts of active solvent to 100 parts of dry resin, even with no plasticizer at all, although more solvent may be employed in coatings for metal. In these proportions, the mixture of active solvents and hydrocarbons does not form solutions with the vinyl chloride resins. To secure adequate flexibility, it is usually unnecessary to add more than an equal part of plasticizer for each part of resin.

The ether-alcohols, especially the monoalkyl ethers of ethylene glycol, such as the monomethyl, monoethyl and monobutyl ethers, have proven valuable dispersing agents in preparing these suspensions. They may be employed in the proportion of 5 to 25 parts of the glycol ether to 100 parts of the vinyl chloride resin, and their inclusion aids in dispersion of the resin and often permits higher total solids contents to be obtained.

It is frequently desired to adjust the solids content or viscosity of these suspensions after preparation, and precautions must be taken to prevent flocculation when additional diluent is added. If aliphatic hydrocarbons are added, the suspensions may become thicker from partial flocculation. The use of a small amount of ethylene glycol monoalkyl ether or controlled amounts of an active solvent in the diluting thinner added to a suspension serves to prevent flocculation. Depending upon the amount of active solvent added, however, the suspensions often become thicker because of the greater partial solvation of the resin by the solvent. In fact, this provides a convenient means of causing thickening to occur. For example, in the preparation of a suspension, of a type suitable for coating cloth, in a pebble mill, the viscosity of the suspension must be kept low enough to permit easy operation of the mill. However, the suspension thus prepared is frequently somewhat too fluid for application to cloth under a doctor knife, and it is possible to cause thickening of the suspension by the addition of a small amount of an active solvent, such as methyl isobutyl ketone.

The dispersing liquids may contain dissolved resins which are soluble in hydrocarbons, such as polyisobutylene, polystyrene, acrylate resins, such as polymerized methyl, ethyl and n-butyl acrylate or methacrylate, as well as phenolic and alkyd resins. These dissolved resins serve to modify the flow characteristics of the suspensions and to aid in film formation, especially where it is not convenient or possible for the coating to be baked immediately after application. This is especially true of suspension coatings for metal, which are normally low in plasticizer content, and which tend to crack upon drying out if they are not baked soon after application. The soluble resins afford a certain amount of film continuity and cohesiveness until the baking operation is carried out. Preferably, any such soluble resins should be compatible with the dispersed resin, but this is not essential. They must, however, be soluble in the blend of aliphatic and aromatic hydrocarbons. The acrylate resins are preferred, since they are compatible in the amounts required.

A small amount of the vinyl chloride resins, up to about 10% of the total amount of vinyl chloride resins, may also be present in solution form by dissolving them in the heated plasticizer, and cooling, before incorporating the plasticizer in the suspension. Such dissolved resins serve much the same purpose as indicated above.

The dispersions may be clear or pigmented as desired, and they may be modified further by inclusion of waxes to obtain decreased moisture vapor transmission or improved abrasion resistance. They may also contain heat or light stabilizers for the vinyl chloride resin. Such compounds as lead stearate, dibutyl tin dilaurate, and calcium butyl aceto-acetate are effective heat stabilizers, while phenyl salicylate and coumarin are examples of light stabilizers. For special purposes, they may contain lubricants or release agents, such as carnauba wax, mineral oil, methoxyethyl oleate, or the like.

The suspension may be prepared in any suitable apparatus, but the preferred method of grinding these dispersions is by use of the pebble mill or ball mill. The buhrstone mill, and the three-roller and five-roller mills can be used also. In fact, any type of mill which is capable of exerting a certain amount of grinding and dispersing action can be used to prepare these suspensions. In some instances, relatively coarse suspensions can be prepared without grinding.

For a given type of mill, there are several different methods of operation. One method of preparing a charge for grinders other than the ball mill is first to mix all the ingredients in a so-called "pony mixer" or paste mixer, and then mill them. For ball milling, premixing is not needed and all the ingredients can be charged directly to the mill. If pigmented dispersions are to be prepared, the resin can be milled separately, and the pigments added later and ground with the resin. Alternatively, the pigments may be thoroughly dispersed in the plasticizer, and then added to the resin suspension. Best dispersion of pigments results when they are compounded with a more soluble type of vinyl or acrylic ester resin on a differential two-roll mill, and the resulting colored chips dissolved in a suitable thinner and added to the resin suspension.

Another method suitable for pebble milling is to add dry resin, with or without a pigment, to a thoroughly dry mill and operate until the resin has been powdered thoroughly. Then the plasticizer and volatile ingredients are added and grinding continued.

The degree of fineness of the dry vinyl chloride resin and the conditions under which it is coagulated from the aqueous suspension resulting from the polymerization, and dried, influence the ease of redispersion of the resin in hydrocarbons and the grinding time required. The grinding of the resin does not reduce the resin to its original particle size, as it exists in the polymerization hydrosol, but it does sufficiently reduce the particle size of the resin agglomerates to improve very markedly the flow characteristics and stability of the suspensions, as well as the smoothness, strength, and uniformity of the resulting coatings. Before milling, the mixtures of resin, plasticizer, pigments and hydrocarbons frequently exhibit extreme dilatancy and other types of anomalous flow. Upon standing, the unmilled mixtures often become almost dry and grainy. As milling proceeds these effects become minimized, and a properly prepared suspension coating shows practically no inverted plasticity or dilatancy. Both thixotropy and pseudo-plasticity are often present, although these properties are greatly influenced by the composition of the particular dispersing medium used. Furthermore, when the original milling is complete, very little change in these properties occurs on storage.

The time of milling is regulated by the characteristics of the particular type of mill, the quality of the original resin used, and the degree of dispersion needed for the particular application. Sixteen hours is usually the minimum grinding time when all ingredients are charged directly to a pebble mill, with grinding periods of 40 to 60 hours being more satisfactory. The stone mill or three-roller mill is much more rapid in its action.

In the grinding of these suspensions, the temperature should be kept low. Otherwise, the solvent action on the resins of the mixture of plasticizer and hydrocarbons may increase sufficiently with rise in temperature to cause the resin to swell and the suspension to thicken. For continuous operation as in a ball mill, the maximum temperature should not exceed 45° to 50° C. for best results. If it is necessary to operate at a higher temperature, the composition of the thinner should be adjusted so as to include more of the aliphatic hydrocarbons.

It has been found that the suspensions as prepared above may be applied by any conventional method. Of course, variations in the evaporation rate of the suspending liquids and in the viscosity of the suspension are required to obtain the best results with the various methods. For coating cloth, methods involving the usual doctor knives or spreader blades can be used, but for coating metal or paper the roller coater or reverse roll coater is recommended. Spraying is quite satisfactory, as are slosh coating, flow coating, dip coating, impregnating, or brushing. In applying thick suspensions, as in casting film or caulking, the various types of extrusion machines may be used.

The characteristics of the suspension coatings on application are somewhat different from those of solution coatings. The suspensions tend to exhibit pseudo-plasticity or false body in many instances. This property is quite helpful in dipping, brushing, slosh coating, and the like, for it tends to prevent sagging. However, it is less desirable in roller coating, spray coating, and the like, where secondary flow is often desirable. Secondary flow of the applied suspension may be obtained to some extent by the inclusion of an active solvent in the thinner. Grinding the composition for longer periods, which results in more finely divided suspensions, is also beneficial. The addition of soluble resins to the vehicle imparts greater cohesiveness to the suspensions, which tends to improve their secondary flow out. Thus, by suitable modifications, very satisfactory coatings may be applied by practically all of the conventional methods of application.

Suspension coatings as described above all require heat treatment after application to form strong, cohesive and adherent films after evaporation of the volatile matter. This is necessary because the solvent action of the liquids on the resin is not sufficient to enable the resin particles to adhere to each other at ordinary temperatures. By heating, the solvent power of the suspending liquid, including the plasticizer or active solvent for the resin, is increased and the resin itself is softened by heat. The net result is the formation of extremely tough films after baking.

The baking temperature needed varies somewhat, depending upon a number of factors. However, temperatures as high as 300° to 360° F. seem to be needed for best results in many cases, and temperatures up to 400° to 450° F. can be employed. Reasonably good results may be obtained at temperatures of 230° to 300° F. if the plasticizer content or proportion of active solvent present is quite high, or if maximum physical properties are not required. Also, the baking temperature required may be lowered by applying solvent to the film before baking or by applying a true solution coating over the suspension coating. These expedients are less desirable from a cost viewpoint.

The interval between application and baking is sometimes quite important. This is especially true where the plasticizer content is quite low and also where larger proportions of more active volatile solvents are included. In such instances it is important to expose the coating to fairly high temperatures before the volatile active solvents have evaporated to any appreciable extent. With more highly plasticized compositions, such as coatings for cloth, the time of exposure before baking makes relatively little difference in the final properties.

Compositions low in plasticizer content and containing relatively volatile ingredients may deposit films which often crack open in many places, if the films are not baked promptly. This phenomenon is caused by shrinkage stress from evaporation of the volatile matter acting upon the film, since the film has little or no cohesive strength until it is baked. This period between application and baking in such instances may be lengthened by using more slowly evaporating ingredients, or by including a soluble resin in the suspension to give the film enough cohesive strength to withstand the shrinkage stresses.

The time of baking is less important than the temperature, and a long baking time at a low temperature is not equivalent to a short baking period at a higher temperature. This is because the fusing effect desired is primarily a function of the film temperature attained. The baking period need only be sufficient to assure that the coating actually reaches the indicated temperature, considering the rate of heat transfer. Once the necessary temperature is reached the time for fusing is ordinarily quite short. For example, on continuous coating machines for paper or cloth, exposure to high temperature for a fraction of a minute may be enough. With more massive articles, such as heavy metal parts, much longer bakes are needed.

The usual types of baking equipment can be used satisfactorily provided some provision for the removal of volatile matter from the oven is made.

The following examples and discussion will serve to illustrate the preparation of the suspensions and their application in various fields.

*Example 1.—Cloth coating*

An olive drab coating composition for cloth suitable for raincoats was prepared by charging a 67 gallon capacity, brick lined pebble mill, which was approximately half filled with assorted flint pebbles and porcelain balls, with the following ingredients:

| Ingredient | Parts |
|---|---|
| Dry vinyl chloride-vinyl acetate copolymer, about 95% vinyl chloride, 25,000 average molecular weight, made by emulsion polymerization process | 70.0 |
| Synthetic iron oxide, yellow | 8.4 |
| Synthetic iron oxide, black | 6.3 |
| Lead titanate | 4.9 |
| Whiting | 21.0 |
| Di(2-ethylhexyl) phthalate | 56.0 |
| Aliphatic hydrocarbon fraction, volume average boiling point=261° F. (25% paraffins, 75% alicyclic hydrocarbons) | 25.2 |
| Hydrogenated petroleum naphtha boiling range 270°–350° F. (93.5% aromatics) | 37.8 |
| | 229.6 |

The mill was allowed to run at about 38 to 40 revolutions per minute for a total of four days. Samples were taken each day, and it was determined that after two days (48 hours) the charge was sufficiently dispersed for application purposes. However, the milling was continued to obtain additional data, and it was observed that the paste became progressively more viscous after the second day. The temperature reached about 47° C., ten degrees above room temperature. The mill was discharged and rinsed with a thinner composition, and the charge composited with the thinner rinse to obtain a mixture of the following ultimate composition:

| Ingredient | Parts |
|---|---|
| Vinyl chloride-vinyl acetate copolymer | 100 |
| Synthetic iron oxide, yellow | 12 |
| Synthetic iron oxide, black | 9 |
| Lead titanate | 7 |
| Whiting | 30 |
| Di(2-ethylhexyl) phthalate | 80 |
| Aliphatic hydrocarbon | 36 |
| Hydrogenated petroleum naphtha | 64.9 |
| Methyl isobutyl ketone | 0.3 |
| | 339.2 |

This mixture contains about 70.2% non-volatile material, and the ratio of resin to hydrocarbons is 1:1. This suspension was applied to cotton cloth on a commercial cloth coating machine. By tilting a sharp blade to the proper angle, it was possible to prevent the coating from striking through to the reverse side of the cloth. The coated cloth passed through a drying oven at about 230° F. and it was then calendered between hot rolls to flatten all protruding fibers. Following this, four additional coats were applied, and each coat was baked.

To develop the maximum strength in the coating, the coated cloth was then further baked by passing it beneath a bank of infra red heat lamps which made possible the proper fusing of the coating into a continuous, strong, flexible, film, well adhered to the cloth.

The coating weight was observed to build up at the rate of 1.0 to 1.5 ounces per square yard per pass, which is four to five times the rate frequently obtained with solution-type vinyl resin coatings for cloth. Behavior of the suspension coating in front of the coating knife was entirely satisfactory.

*Example 2.—Clear coating for textiles*

A clear coating composition suitable for use on cloth is as follows:

| Ingredient | Parts |
|---|---|
| Vinyl chloride-vinyl acetate copolymer (of type described in Example 1) | 100 |
| Di(2-ethylhexyl) phthalate | 50 |
| Butyl ester of acetylated polymerized ricinoleic acid | 25 |
| Aliphatic hydrocarbon (as described in Example 1) | 30 |
| Hydrogenated petroleum naphtha (as described in Example 1) | 40 |
| Dibutyl tin dilaurate | 1 |
| | 246 |

This was prepared by adding all ingredients to a one gallon capacity pebble mill and allowing it to run for four days. After discharging from the mill the resulting suspension was observed to be very finely and uniformly ground. This was applied to a piece of olive drab cotton cloth of the type used for raincoats, using a sharp knife to prevent penetration. After a bake of one minute at 250° F., the coating was sanded lightly to remove protruding fibers, and then given two additional coats with a rounded blade. Each coat was baked for one minute at 250° F. A final bake of one minute at 340° F. served to fuse the coating together. A very tough, flexible, clear coating was obtained.

The suspensions may also be applied in amounts insufficient to form a continuous film, and the cloth thus lightly impregnated without reducing its porosity. The suspensions may also be diluted and used to waterproof, weatherproof, or fireproof cloth. Where fireproof qualities are desired, antimony oxide may be employed as a pigment. Such coatings should be baked as illustrated above. Lighter coats may also be applied as a size to stiffen the fabric. When the suspensions are highly plasticized, such sizing coating also increases the abrasion resistance of the cloth.

The suspensions of high total solids may be employed as textile printing pastes to print designs directly into cloth in lieu of dyeing. The heavy pastes may also be used as adhesives to bond cloth together at the seams. The application of heat and pressure serves to fuse the particles together, and to form a tight bond between the overlapping layers of cloth. Two or more layers of cloth may also be laminated with the suspensions. The suspensions may also serve to anchor fibers to a base as in plush and other pile fabrics.

Rayon, cotton and other filaments may be coated by drawing the thread through the suspension, and baking. The coated yarns have improved strength and water resistance; and they may be used as paint brush bristles, or woven into window screening, inner soles for shoes, mosquito netting and the like.

Example 3—Paper coating

The following composition was charged to a pebble mill:

| | Parts |
|---|---|
| Vinyl resin (composition as in Example 1) | 100 |
| Di(2-ethylhexyl) phthalate | 15 |
| Butyl ester of acetylated polymerized ricinoleic acid | 25 |
| Di(butoxyethyl) phthalate | 5 |
| Xylene | 30 |
| Mineral spirits, boiling range 305.5° to 405° F. | 24 |
| | 199 |

To 100 parts of the resulting suspension, 20 parts were added of a 50% solution of paraffin wax, melting point 165° F., in hydrogenated petroleum naphtha.

Each suspension was applied to glassine paper by a knife coater, and the coatings were baked for 20 seconds at 250° F. and then for 10 seconds at 400° F. The resultant coatings were both of about 0.5 mill thickness, had an attractive luster, and were tough, flexible, and adherent. The wax-containing composition was about one-fourth as permeable to moisture vapor.

The base suspension without the wax was applied to paper, but the final bake at 400° F. was omitted. The film strength of the coating was poor, and the moisture vapor permeability was about ten to twelve times as great, which illustrates the importance of the baking schedule in coating paper. The coated paper may be employed for bottle cap liners, food wrappers, soap labels, cigarette packages and the like.

Example 4—Film casting

The following suspension was prepared by ball milling:

| | Parts |
|---|---|
| Dry vinyl chloride-vinyl acetate copolymer 95.6% vinyl chloride, 0.316 specific viscosity (0.10 gm. resin in 50.0 cc. isophorone), made by emulsion polymerization process | 100 |
| Di(2-ethylhexyl) phthalate | 40 |
| Aliphatic hydrocarbon (as described in Example 1) | 40 |
| Hydrogenated petroleum naphtha (as described in Example 1) | 60 |
| Dibutyl tin laurate-maleate | 1 |
| | 241 |

After thorough milling in the pebble mill, most of the dispersed particles were less than 3 microns in diameter, and very few particles had diameters within the range of 5 to 10 microns.

This suspension was applied to a sheet of Cellophane having a paper backing, and the coated sheet passed through an oven at 300° F. The resultant clear film was about 2 mills in thickness, and could be removed readily from the Cellophane. A portion of the film before being stripped from the Cellophane was additionally baked for 20 seconds at 375° to 400° F. This improved the strength of the film. Films may also be cast on continuous belt machines.

Filaments may be drawn from the suspension by forcing the suspension through a heated orifice into a heated chamber.

Example 5.—Packaging materials

Two hundred and forty-one parts of the suspension of Example 4 were diluted with 100 parts of a mixture of equal volumes of methyl isobutyl ketone and the hydrogenated petroleum naphtha described in Example 1. The resulting composition was applied to paper hoods for milk bottles, and the hoods after baking at 350° to 400° F., were applied over milk bottles and heat-sealed. Good bonds were obtained.

A suspension similar to that of Example 4 was applied to the inside of a paper container by sloshing and draining, followed by a two minute bake at 350° F. A tough adherent lining, free from pinholes was obtained, which was non-toxic and not attacked by foods. Aluminum, tin or lead foil may also be coated with these suspensions and used for packaging materials. A primer coating of a copolymer of vinyl chloride, vinyl acetate and maleic acid may be used to increase the adherence to the foil.

Example 6.—Coatings for metal

Protective coatings for metal are an important field for high molecular weight vinyl chloride resins because of the higher softening point and chemical resistance of these resins, but the difficulties of applying such resins from solutions has retarded their development for this purpose.

The following composition was prepared for this purpose; the low plasticizer content, the compensating inclusion of an active solvent, the addition of a soluble resin, and the addition of a glycol ether, all for the purposes heretofore described, are noteworthy:

| | Parts |
|---|---|
| Vinyl chloride-vinyl acetate copolymer, 95.6% vinyl chloride, 0.316 specific viscosity (0.10 gm. in 50.0 cc. isophorone), made by emulsion polymerization | 100 |
| Titanium dioxide | 66 |
| Di(2-ethylhexyl) phthalate | 10 |
| Dibutyl tin laurate-maleate | 1 |
| Sodium salt of dioctyl sulpho-succinic acid | 3 |
| n-Butyl methacrylate polymer | 2 |
| Isophorone | 86 |
| Methyl amyl acetate | 24 |
| Methyl n-amyl ketone | 23 |
| Aliphatic hydrocarbon (as described in Example 1) | 75 |
| Hydrogenated petroleum naphtha (as described in Example 1) | 153 |
| Ethylene glycol monoethyl ether | 43 |
| | 586 |

After milling this composition for 24 to 48 hours in a ball mill, it had a viscosity of 20 seconds, as measured by a Ford cup No. 4 tip, and it could be sprayed readily.

The suspension was applied to a steel panel which bore a previously baked coating of a lacquer grade copolymer of vinyl chloride with vinyl acetate. After the panel was air-dried for one to two minutes, it was baked at 350° F. for 10 minutes. A glossy, tough, smooth and adherent finish resulted. There was no tendency to blister during baking.

The inclusion of the ketones, the methyl amyl acetate, and the glycol ether, as well as a hydrocarbon soluble methacrylate ester polymer, helped prevent cracking of the film before baking. Even so, it is recommended that the panels be baked almost immediately, which precaution is entirely practical. The resin content at spraying viscosities is about four times as great as is obtainable in solutions of such resins in cyclohexanone or in isophorone-xylene mixtures, and the ratio of resin to solvents (ketones and ester) is many times as great. Thus, the economy of suspension coatings is apparent.

Example 7.—Coatings for wire

The following suspension was prepared:

| | Parts |
|---|---|
| Vinyl chloride-vinyl acetate copolymer as in Example 6 | 100.0 |
| Tricresyl phosphate | 13.6 |
| Di(2-ethylhexyl) phthalate | 32.0 |
| Litharge | 3.0 |
| Basic lead carbonate | 6.0 |
| Fused lead stearate | 1.2 |
| Carbon black and mineral oil | 6.4 |
| Aliphatic hydrocarbon (as described in Example 1) | 40.0 |
| Hydrogenated petroleum naphtha (as described in Example 1) | 70.0 |
| Ethylene glycol monoethyl ether | 15.3 |
| | 287.5 |

This suspension had a total non-volatile content of 56%. Copper wires were coated by dipping them in the suspension and withdrawing them at constant speed to simulate commercial conditions. The coated wires were baked for 10 minutes at 150° F., and then for one minute at 350° F. The coating thickness was about 3.5 to 4.0 mils. The coatings exhibited all the qualities characteristic of these resins, such as good flexibility and electrical properties, and resistance to oil, water, sunlight and fire.

Suspensions of lower plasticizer content may be employed, in which case coatings similar to magnet wire enamel are produced. Also, suitably pigmented primer coats of vinyl chloride-vinyl acetate copolymer of the type used in lacquers may be applied. Blue lead is a good pigment for this purpose.

Example 8.—Hollow articles

The suspensions are well suited for forming hollow, flexible articles by dipping a porcelain or other form into the suspension, removing the form followed by baking, and then stripping the article from the form when cool. Gloves, bathing caps, balloons, baby pants, overshoes, and elastic bandages are representative of the many articles which can be made in this manner. The pseudoplasticity of the suspensions, in this respect, is particularly helpful in preventing the suspensions from flowing off the form. As an example, a glass test tube was dipped into a suspension similar in composition to that of Example 4, removed, and then baked for ten minutes at 350° F. Following this, a transparent plastic tube was removed from the glass test tube.

Example 9.—Vinyl chloride resin suspension and phenolic resins

The suspensions of the vinyl chloride resins in hydrocarbons may be blended with solutions of phenolic resins in hydrocarbons, without precipitation or seediness. This is important, since few, if any, mutual solvents for the vinyl chloride resins and the phenolic resins, including phenol-formaldehyde resins, are known. A suspension of a vinyl chloride resin in a mixture of plasticizer and hydrocarbons, as described in the preceding examples, was blended with a solution of a non-air-drying, tung oil-modified cresol-formaldehyde resin solution in toluene containing 60% total solids in the ratios of 1:1, 1:2, and 1:4, respectively. After diluting, the mixtures were sprayed on metal panels and baked. Tough and adherent films were obtained.

Example 10.—Vinyl chloride resin suspension and alkyd resins

The following composition was charged to a pebble mill:

| | Parts |
|---|---|
| Vinyl resin as in Example 6 | 80 |
| Hydrogenated petroleum naphtha (boiling range 200.3 to 275° F. containing about 73% aromatic hydrocarbons) | 132 |
| Xylene | 48 |
| | 260 |

After 16 hours, 15 parts of "Solvesso" No. 1 and 5 parts of xylene were added to the composition to reduce the viscosity, and then 104 parts of a drying oil modified alkyd resin supplied as a 60% solution in mineral spirits and 40 parts of an alkyd resin supplied as a 70% solution in xylene were admixed with the diluted composition. Suitable alkyd resins include any resinous condensation product of a polyhydric alcohol with a polybasic acid, including glyceryl-phthalate resins, triethylene glycol-maleate resins and pentaerithrityl-phthalate resins, as well as alkyd resins modified with castor oil, soyabean oil, tung oil, dehydrated castor oil, and linseed oil.

After four days operation, the mill was stopped, and 7.5 parts of a 0.6% solution of cobalt naphthenate in toluene were added. The dispersion was diluted with xylene to spraying viscosity, and applied to steel panels. After drying, two coats of a pigmented white enamel containing a soluble type copolymer of vinyl chloride with vinyl acetate were applied over the primer. Much better adhesion of the finish was obtained than over the alkyd resins alone.

*Example 11.—Polyvinyl chloride suspensions*

Vinyl chloride was emulsified in water under pressure and polymerized in the presence of a catalyst at a temperature of about 40° to 50° C. The resulting hydrosol was broken by slow freezing and thawing. The resin was then washed and dried. The following compositions were charged to a pebble mill, and ground for several days:

|  | A | B |
|---|---|---|
|  | Parts | Parts |
| Polyvinyl chloride | 100 | 100 |
| Di(2-ethylhexyl) phthalate | 40 |  |
| Aliphatic hydrocarbon fraction, volume average boiling point=261°F.(25% paraffins, 75% alicyclic hydrocarbons) | 40 |  |
| Hydrogenated petroleum naphtha (boiling range 270°-350° C. (93.5% aromatics)) | 60 | 145 |
| Methyl isobutyl ketone |  | 25 |
| Dibutyl tin dilaurate |  | 1 |
|  | 240 | 271 |
| Total solids content, per cent | 58.4 | 36.8 |
| Viscosity, No. 4 Ford Cup, seconds | 13 | 180 |

Films were cast from each dispersion and baked for 5 minutes at 350° F. Strong and flexible films were obtained in both instances, exhibiting the characteristic properties of plasticized and unplasticized films. However, it should be noted that composition A, in which the thinner comprised a blend of aromatic and aliphatic hydrocarbons in the preferred proportions, had a higher total solids content, and a lower apparent viscosity than composition B.

*Example 12.—Suspensions from vinyl chloride-acrylonitrile copolymers*

The following dispersion was prepared by grinding in a pebble mill:

|  | Parts |
|---|---|
| Vinyl chloride-acrylonitrile copolymer, 61.4 per cent vinyl chloride prepared according to application Patent No. 2,420,330 of L. C. Shriver and G. H. Fremon | 100 |
| Butyl phthalyl butyl glycolate | 40 |
| Xylene | 270 |
| Aliphatic petroleum naphtha, boiling range 200° to 250° F | 25 |
|  | 435 |

A smooth dispersion was obtained. This was diluted with 22 parts of isophorone, and the dispersion was spread on a glass plate. After baking for 20 minutes at 375° F., a tough, smooth, transparent film was obtained.

From the above examples, it is apparent that the suspensions are useful for many other purposes. They may be used to line concrete and metal tanks, where a chemically resistant fluid is required as in gasoline tanks. They may be used as stop-off lacquers in electroplating, or as linings for battery boxes.

Because they may be formulated as highly viscous fluids, the suspensions may be used for caulking and sealing purposes, as in repairing vinyl resin lined tanks. The necessary heating may be obtained by portable infra red lamps. Also, the suspensions may be mixed with cork and spread over the inner sole of the shoe as a shoe filling. Properly pigmented paste may also be used to repair vinyl resin sheeting, which has become marred in processing, as in manufacturing shoes. The suspensions are useful for many other coating applications where baking of the coating is possible.

We claim:

1. A stable, fluid suspension of a toluene-insoluble vinyl resin in a suspending liquid comprising a solvent plasticizer for the resin and a mixture of liquid hydrocarbons containing from 20 to 80% aromatic hydrocarbons and from 20 to 80% aliphatic hydrocarbons, the ratio of said vinyl resin to said mixture of hydrocarbons being between 0.3:1 and 1.9:1 and the ratio of said plasticizer to said vinyl resin being between 0.35:1 and 1:1, and said vinyl resin being a minutely sub-divided emulsion polymer of a monomeric substance predominantly comprising vinyl chloride.

2. A stable, fluid suspension of a toluene-insoluble vinyl resin in a suspending liquid comprising di(2-ethylhexyl) phthalate and a mixture of liquid hydrocarbons containing from 50 to 70% aromatic hydrocarbons and from 30 to 50% aliphatic hydrocarbons, the ratio of said vinyl resin to said mixture of hydrocarbons being between 0.5:1 and 1.2:1 and the ratio of di(2-ethylhexyl) phthalate to said vinyl resin being between 0.35:1 and 1:1, and said vinyl resin being a minutely sub-divided emulsion copolymer of a mixture of monomers consisting of a major amount of vinyl chloride and a minor amount of vinyl acetate.

GEORGE M. POWELL, 3RD.
THEODORE E. MULLEN.

REFERENCES CITED

The following references are of record in the file of this patent:

FOREIGN PATENTS

| Number | Country | Date |
|---|---|---|
| 113,751 | Australia | Aug. 25, 1941 |
| 500,298 | Great Britain | July 28, 1938 |